Feb. 9, 1965  A. O. G. ERNST ETAL  3,169,000
AUTOMATIC ATTITUDE CONTROL DEVICE FOR V.T.O.L.
Filed July 26, 1961  3 Sheets-Sheet 1
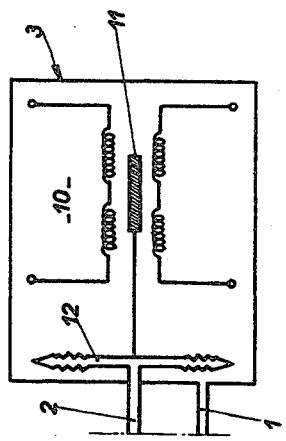
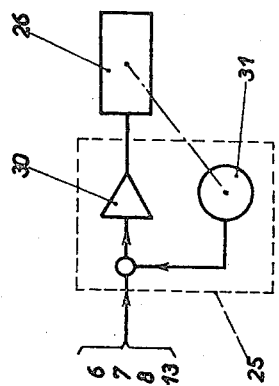
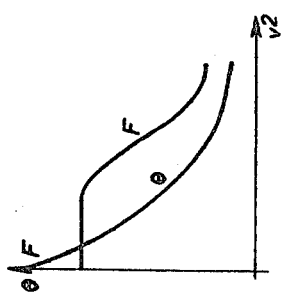
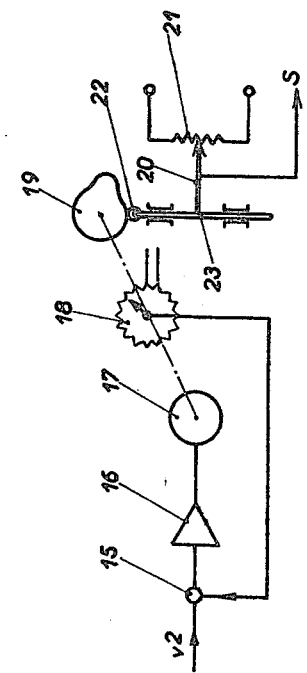
INVENTORS
Adolphe O.G. Ernst
Jean P. J. Jardinier
Janos Rona
Watson, Cole, Grindle & Watson
ATTORNEYS

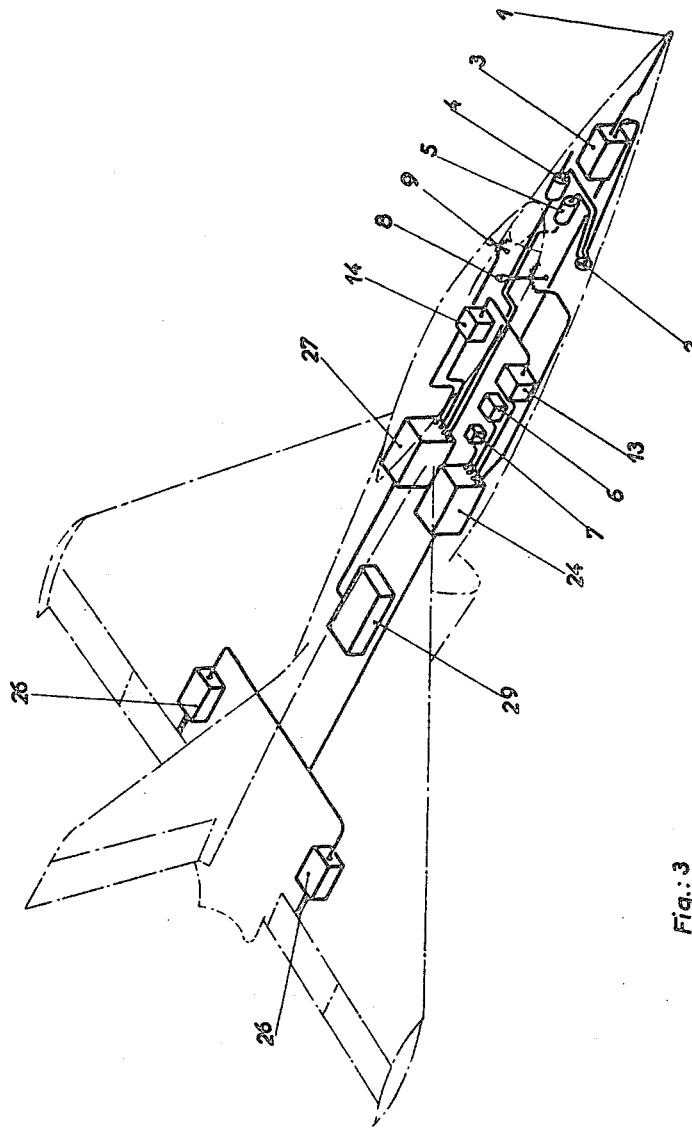
Fig.: 3

United States Patent Office 3,169,000
Patented Feb. 9, 1965

3,169,000
AUTOMATIC ATTITUDE CONTROL DEVICE
FOR V.T.O.L.
Adolphe Otto Gontier Ernst, Bois-le-Roi, Jean Paul Joseph Jardinier, Vitry-sur-Seine, and János Róna, Dammarie-les-Lys, France, assignors to Societe Nationale d'Etude et de Construction de Moteurs d'Aviation, Paris, France, a company of France
Filed July 26, 1961, Ser. No. 128,321
Claims priority, application France, Aug. 1, 1960, 834,660
3 Claims. (Cl. 244—76)

The present invention relates to the operation of landing of aircraft of the so-called V.T.O.L. type tail-sitter aircraft. In order to reduce the duration of this operation and the fuel consumption, which is particularly high during its course, since the engine has to work at its maximum power, it is known that there is an advantage in preventing "zoom" with its corresponding gain in altitude, and in effecting a nose-lift manoeuvre of the order of 90° while flying horizontally, the aircraft then remaining at a low constant altitude during the whole operation of change of attitude.

During the course of this nose-lift manoeuvre, which is particularly delicate, the speed of the aircraft decreases progressively and becomes zero when its pitch-angle $\theta$ (the angle between the longitudinal axis and the horizontal) reaches about 90°, whereas the thrust F increases so as finally to balance the weight of the aircraft.

The variation of $\theta$ and of F during the nose-lift manoeuvre can be established with accuracy, by taking account of the characteristics of the aircraft. FIG. 1 shows the form of the curves of $\theta$ and F as a function of the square of the horizontal speed $v^2$ of the aircraft.

However, it is clearly very difficult for the pilot to manipulate at the same time his control stick and his engine throttle so as constantly to regulate the pitch-angle and the thrust to the suitable values determined by the curves of FIG. 1 referred to above.

The object of the present invention is to relieve the pilot of this task by rendering automatic the correct operation of nose-lifting the aircraft at constant altitude upon a single control operation by the pilot.

Thus, after a conventional landing approach in horizontal flight at reduced uniform speed, decreased thrust and very low pitch-angle (conditions corresponding to the right-hand end of the curves of FIG. 1), the pilot will just have to switch in the automatic device of the invention and start pulling his control stick.

Immediately, the pitch-angle $\theta$ begins to increase, thereby increasing the drag of the aircraft and decreasing the speed $v$. Thanks to the action of the automatic device of the invention, this decrease in speed $v$, will result in an increase in thrust F and a further increase in pitch-angle $\theta$. The drag going on increasing, the speed $v$ goes on decreasing, which produces a further increase in $\theta$ and F, and so on, until the aircraft reaches a purely vertical attitude ($\theta = 90°$) with a maximum thrust (F=weight of aircraft) and hovers ($v=o$). These conditions correspond to the left-hand end of the curves of FIG. 1.

The transition phase being then terminated, the pilot just switches off the automatic device of the invention and performs a conventional tail-landing by operating his throttle lever to slightly decrease the thrust.

In other words, the invention is applicable to the transition phase of the tail-sitter V.T.O.L. aircraft, after a conventional horizontal landing approach and before a conventional vertical tail sitting. It will be put into action at the beginning of the transition phase and out of action at the end of his phase.

The invention has therefore for its object a piloting device comprising essentially two cams or other members respectively putting in concrete form the predetermined curves of variation of the pitch-angle and the thrust as a function of the speed suitably detected, or better still as a function of the square of this speed, and supplying in consequence signals acting on the elevators of the aircraft and on the throttle of the engine, an adequate closed-loop servo system being provided.

The description which follows below with reference to the accompanying drawings, given by way of example only and without any limitation, will make it quite clear how the invention may be carried into effect.

FIG. 1 shows the curves of which an explanation has already been given above.

FIG. 3 is a view of the control system in perspective, showing the arrangement of the various elements of the device inside the body of an aircraft.

FIGS. 4 and 5 show details of this arrangement.

FIG. 6 is a similar diagram showing a rate closed-loop servo system.

Figure 2:
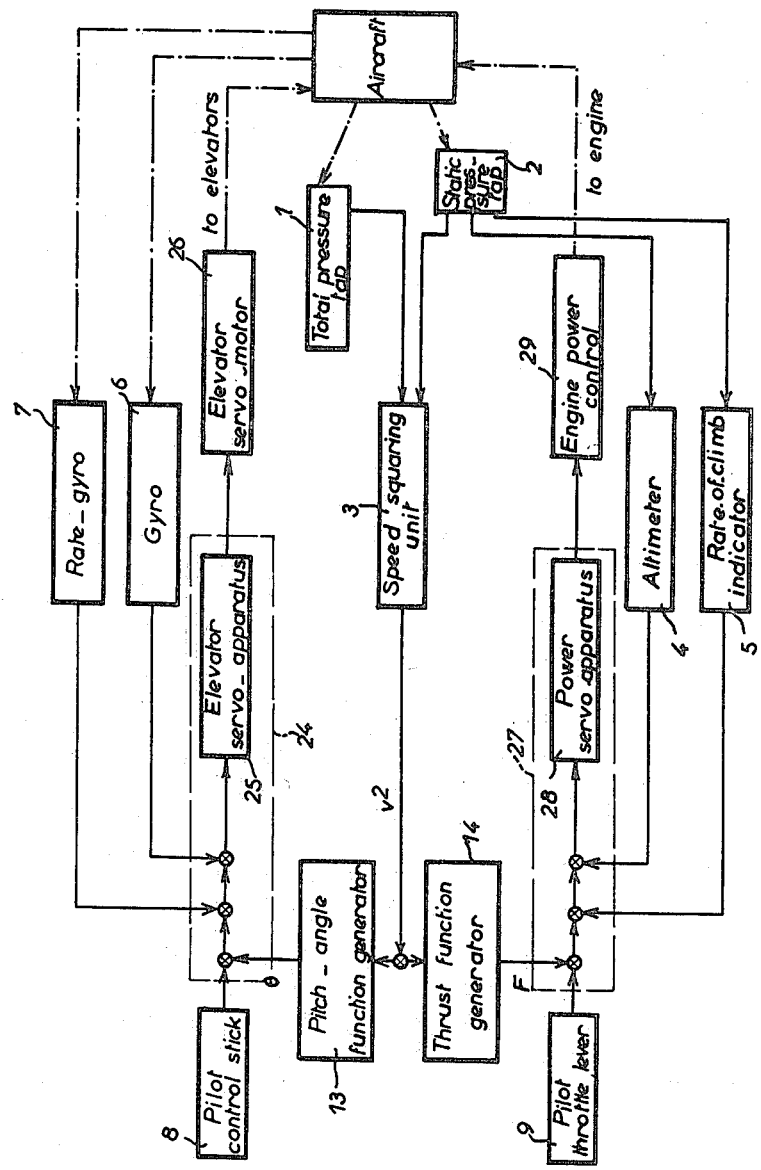
FIG. 2 is a block diagram of a servo control system in accordance with the present invention.

In FIGS. 2 and 3, there have been shown at 1 and 2 taps of total and static pressure which supply a speed squaring unit 3 with the parameters enabling it to prepare a signal proportional to the square of the speed of the aircraft, the static pressure tap 2 being furthermore associated with an altimeter 4 and a rate-of-climb indicator 5. There are also shown at 6 and 7 a vertical gyro and a rate gyro, at 8 the control-stick and at 9 the engine throttle. All these devices are comprised in installations currently provided on board aircraft.

The speed squaring unit 3 may for example be of the known type with a differential transformer 10 (see FIG. 4) having a moving armature 11 coupled to a manometric capsule 12 subjected to the differences between the total and static pressures respectively detected by 1 and 2. The operation of a differential transformer of this kind is described in French Patent No. 1,271,552, issued on August 7, 1961.

In accordance with the present invention, the speed squaring unit 3 supplies its output signal to two function generators 13 and 14, which respectively work out signals proportional to the values of the pitch-angle $\theta$ and of the thrust F as a function of the square of the speed $v^2$, in accordance with the pre-established laws shown in FIG. 1.

FIG. 5 shows by way of example how a function generator may be produced in practice.

The signal $v^2$ coming from the speed squaring unit is transmitted, through the intermediary of a discriminator 15, to an amplifier 16 which energizes an electric motor 17, driving on the one hand the slider of a potentiometer 18 connected by a rebalance loop to the discriminator 15, and on the other hand a cam 19, the profile of which puts in concrete form the law $\theta=f(v^2)$ in the case of the pitch angle function generator 13, and $F=f'(v^2)$ in the case of the thrust function generator 14.

The rotation of the motor 17 continues until the voltage supplied by the potentiometer 18 balances the signal $v^2$ applied to the discriminator 15. There is thus obtained an angular position of the motor 17 and therefore a new position of the cam 19, which depends on the value of the signal $v^2$.

To this angular position of the cam 19 there will correspond a position of the slider 20 along the potentiometer 21, by virtue of the kinematic coupling shown by way of example by a cam-follower 22–23 coupled to the slider 20. The signal collected at the output S of the function generator will be the expression of $\theta$ or F, as the case may be.

Reverting now to the diagrams of FIGS. 2 and 3, the signal $\theta$ delivered by the pitch angle function generator 13 is applied to one of the inputs of an amplifying unit 24, which furthermore receives the signals coming from the vertical gyro 6, the rate gyro 7 and the control-stick 8. This unit, which comprises a servo apparatus 25, transmits the desired signal to the hydraulic servos 26 which actuate the elevators of the aircraft. In the same way, the signal F delivered by the thrust function—generator 14 is applied to an amplifying unit 27 similar to that above, and also comprising a servo apparatus 28. This latter unit which receives however, in addition to the signal F, the signals coming from the altimeter 4, the rate-of-climb indicator 5 and the engine throttle 9 is coupled to the engine power control 29.

FIG. 6 shows an example of servo-system in the case of the control of pitch angle: the algebraic sum of the control and rebalance signals corresponds to an electric deviation signal which, amplified at 30, causes actuation of the hydraulic servo 26 at a speed which is proportional to the deviation signal. In fact, the signal of speed of the hydraulic servo, detected by a tachometer dynamo 31 coupled to the hydraulic servo, is opposed to the control signal. Therefore, the deviation signal becomes zero when the control signal and the speed of the hydraulic servo have corresponding values.

The elevator being mechanically coupled to the hydraulic servo, causes nose-lift of the aircraft consequent on the position of the elevator. When the desired pitch angle has been obtained, the deviation signal becomes zero and the speed of the elevator is zero.

If there are no external moments applied to the aircraft (aerodynamic moments for example), the result is that the position of the elevator corresponds to a zero controlling moment. If disturbing moments exist, the elevator takes up a position such that there is a controlling moment which compensates them. There is therefore no error of pitch angle under continuous working conditions.

The advantage of the application of the speed closed-loop control systems is the great rapidity of the response and the return to the original values after a disturbance (provided there is a position sensing detector in the system).

It will be appreciated that the various devices shown in the block diagram of FIG. 2, except of course the function generators 13 and 14, are to be found on existing aircraft, whether conventional or V.T.O.L. aircraft. The invention is focused on the interconnection of the speed squaring unit 3 with the elevator control 24–26 and power control 27–29 through the specially designed function generators 13 and 14, respectively.

In order to put the system of the invention in and out of action, it will therefore be sufficient to provide a switch operable by the pilot, at any convenient point of the diagram of FIG. 2, e.g., just upstream or just downstream of the function generators 13 and 14. To start the nose-lifting or transition phase, the pilot will just close the switch and will open it at the end of this phase, as explained above.

The device which has just been described ensures the stability of the aircraft during the course of the nose-lift manoeuvre while at the same time the stability of operation of the device itself is ensured.

What we claim is:

1. An automatic nose-lifting device for converting the attitude of a tail-sitter V.T.O.L. aircraft from substantially horizontal to substantially vertical while the engine thrust is progressively increased and the aircraft moves along a nearly horizontal path, said device comprising two cams respectively putting in concrete form predetermined curves of variation of the pitch angle and engine thrust as a function of the square of the horizontal aircraft speed during said attitude conversion, an aircraft speed squaring unit adapted for producing a signal proportional to the square of said speed, cam servo-control means responsive to said signal for adjusting the position of each of said cams in accordance with said signal, cam-follower means associated with each of said cams for producing respectively pitch-angle control signals and engine thrust control signals depending on the position of the respective cams, an aircraft elevator servo-apparatus responsive to said pitch-angle control signals for nose lifting the aircraft accordingly, and an engine thrust servo-apparatus responsive to said engine thrust control signals for varying the engine thrust accordingly.

2. A device as claimed in claim 1, wherein the aircraft speed squaring unit comprises a total pressure tap and a static pressure tap on an outer portion of the aircraft, a manometric capsule pneumatically connected with said taps and responsive to the difference between the total pressure and static pressure detected thereby, and a differential transformer having a movable core under the control of said capsule, and wherein the cam servo-control means are responsive to the output signal of said differential transformer.

3. An automatic nose-lifting device for converting the attitude of a tail-sitter V.T.O.L. aircraft from substantially horizontal to substantially vertical while the engine thrust is progressively increased and the aircraft moves along a nearly horizontal path, said device comprising an aircraft speed squaring unit adapted for producing a first signal proportional to the square of the horizontal aircraft speed during said attitude conversion, means responsive to said first signal for generating a pitch-angle control signal which is related to said first signal in accordance with a predetermined law, further means responsive to said first signal for generating an engine thrust control signal which is related to said first signal in accordance with a further predetermined law, an aircraft elevator servo-apparatus responsive to said pitch-angle control signal for nose-lifting the aircraft accordingly, and an engine thrust servo-apparatus responsive to said engine thrust control signal for varying the engine thrust accordingly.

References Cited by the Examiner

UNITED STATES PATENTS

| | | | |
|---|---|---|---|
| 2,620,149 | 12/52 | Strother | 244—77 |
| 2,701,111 | 2/55 | Schuck | 244—77 |
| 2,936,134 | 5/60 | Miller et al. | 244—77 |

FERGUS S. MIDDLETON, *Primary Examiner.*